United States Patent
Deskey

[15] 3,654,807
[45] Apr. 11, 1972

[54] ANGLE OF ATTACK INDICATING SYSTEM

[72] Inventor: Donald Stephen Deskey, 9838 Burgen Avenue, Los Angeles, Calif. 90034

[22] Filed: Jan. 30, 1970

[21] Appl. No.: 7,287

[52] U.S. Cl. ................................73/180, 73/189, 114/102
[51] Int. Cl. .............................................G01c 21/00
[58] Field of Search ..........................73/180, 188, 189, 178; 114/102

[56] References Cited

UNITED STATES PATENTS

| 2,512,278 | 6/1950 | Jones | 73/180 |
| 3,304,778 | 2/1967 | Stuart | 73/189 |

*Primary Examiner*—Donald O. Woodiel
*Attorney*—Jessup & Beecher

[57] ABSTRACT

An electronic angle of attack indicating system is provided which may be used, for example, to indicate the sail trim of a sailboat, or the angle of attack of an aircraft, or the like, so that the sail or the aircraft may be maintained at any preset attack angle. The system of the invention uses a pair of temperature sensitive devices, such as thermistors, which are mounted on either side of the leading edge of an airfoil, such as a sail or wing, and which sense the air flow differential on the opposite sides of the airfoil, by virtue of the resulting temperature differences. An electric indicating system coupled to the temperature sensitive devices indicates the existence of the air flow differential, so that the appropriate adjustments may be made to maintain the preset attack angle.

6 Claims, 7 Drawing Figures

PATENTED APR 11 1972 3,654,807

*INVENTOR.*
DONALD STEPHEN DESKEY
BY JESSUP AND BEECHER

Warren T. Jessup
ATTORNEYS

3,654,807

ANGLE OF ATTACK INDICATING SYSTEM

BACKGROUND OF THE INVENTION

In sailing, it is important that the trim of the sail be maintained at an optimum attack angle with respect to the wind. By the use of the system of the present invention, any departure from the optimum angle of attack is indicated so that appropriate adjustments may be made.

Effectively, the system to be described provides an indication of change of angle of attack of the sail from a predetermined setting in a qualitative manner. As is well known, a sail is similar to the wing of an aircraft, in that both airfoils develop lift and both can be stalled. The concept of the invention, therefore, can be applied to aircraft, or to any airfoil application in which an optimum angle of attack is to be maintained, although the particular description to be contained herein will be applied to the jib of a sailboat.

The sensing elements to be described are temperature sensitive devices, such as thermistors, which are mounted on either side of the sail near its leading edge. However, other sensing elements such as hot wires, or other temperature responsive elements which may, for example, be mounted on the surface of the sail on either side near the leading edge, or flush with the wing of an aircraft on the top and bottom sides near the leading edge, may be used. Moreover, the sensing elements could take the form of small probes located in the air stream at the same locations. Alternatively, the sensing elements may be mounted on a small fixed vane attached to the leading edge of the sail or wing, or other appropriate devices may be used.

The sensing elements in the embodiment to be described are heated by a constant current source and a differential voltage output is derived. This voltage output is used to energize appropriate indicator lamps. However, it could be amplified and linearized, and could then be used to drive an "angle of attack" indicator. Moreover, if the angle of attack exceeds a predetermined maximum, which is indicative of a stalling condition, a stall warning horn, or other indicator could be actuated.

An advantage of the system of the present invention over prior art systems is that it uses no moving parts. In addition, the sensing elements may be flush with the sail or wing, as mentioned above, so as to provide no interference with the proper operation of the airfoil.

DETAILED DESCRIPTION OF THE ILLUSTRATED EMBODIMENT

Figure 1:
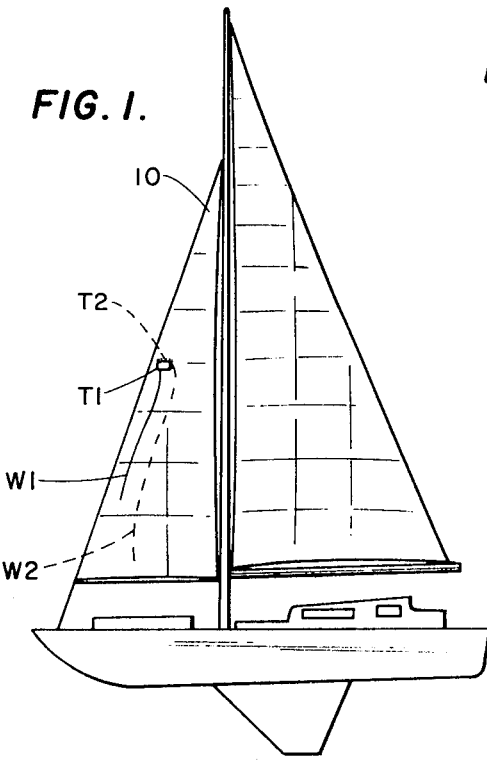
FIG. 1 is a representation of a sailboat, and showing the manner in which sensing elements incorporated into the system of the invention are mounted on opposite sides of the jib adjacent its leading edge.

As shown in FIG. 1, a pair of thermistors, for example, designated T1 and T2, which are preferably matched and mounted in housings which direct the air flow horizontally past the thermistors. The housing are affixed to the opposite sides of a fore sail, such as the jib 10, of a sailboat, adjacent the luff or leading edge of the sail. When the thermistors are matched, there is no need to readjust the circuit with each change in ambient temperature and wind velocity. The sailor sets his sail to a certain trim which hopefully is the optimum trim and which establishes a certain differential in air flow velocity between the fore face and aft face of the sail, and the system of the invention measures the air flow differential to provide an indication of any departure of the sail from the pre-set trim. At optimum trim, for example, and under venturi principles, the velocity of air across the fore face is greater than across the aft face to produce the decreased pressure on the fore face for the desired airfoil draw effect. As will be described, the system of the invention is balanced, for example, to the differential air velocity at which the sail is set, and it indicates any departure therefrom, since such departure is accompanied by a change in the differential temperature of the two thermistors.

The thermistors T1 and T2, preferably matched, are connected to the electronic circuitry in the system of the invention by means of leads W1 and W2. A pair of transistors Q5 and Q6 in the electronic circuitry may also preferably be matched.

Figure 2:
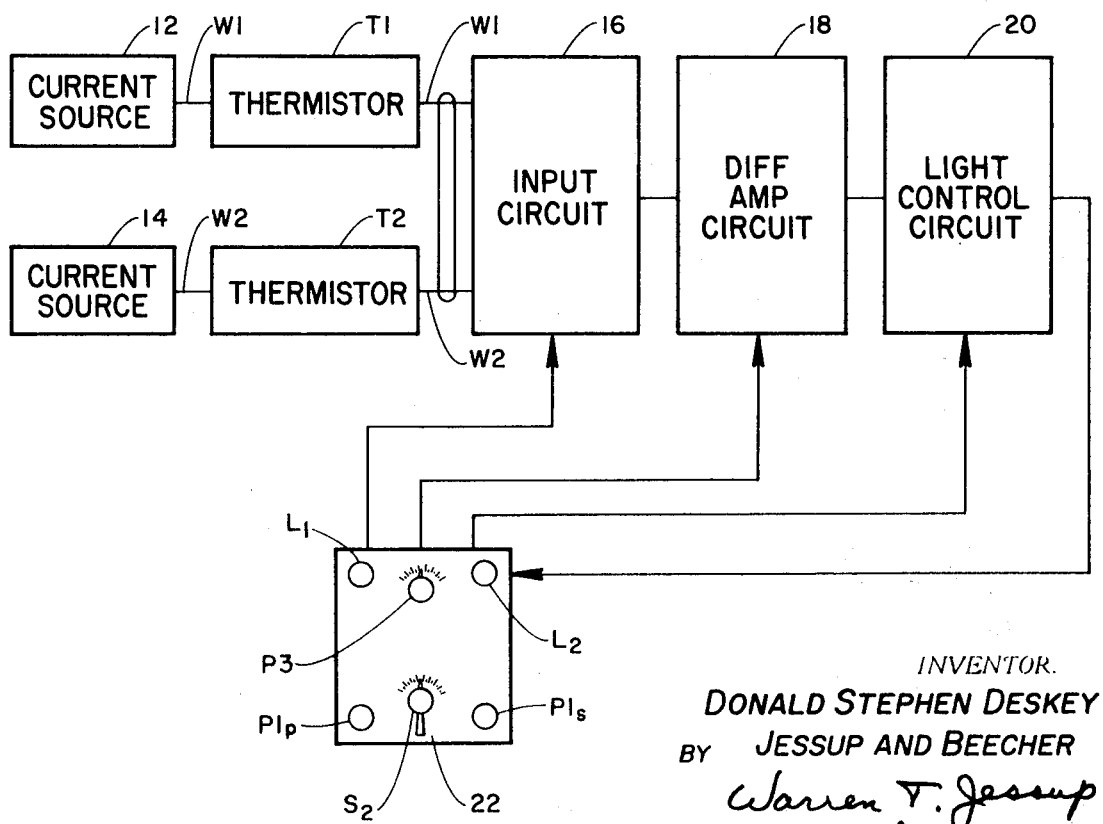
FIG. 2 is a block diagram of an electronic system which may be connected to the sensing elements of FIG. 1.

As shown in FIG. 2, the thermistors T1 and T2 are energized by identical current sources 12 and 14. The thermistors are connected into an input circuit 16 which, in turn, is connected to a differential amplifier circuit 18. The output from the differential amplifier circuit is passed through a light control or light driver circuit 20 which, in turn, is connected to a pair of electric indicator lights $L_1$ and $L_2$ on a control panel 22. The control panel 22 also includes a light dimmer control P3 which adjusts the intensity of the lights $L_1$ and $L_2$ for daylight and night time conditions. A port trim control $P1_p$ is provided on the control panel, as well as a starboard trim control $P1_s$. In addition, a trim control selector switch $S_2$ is provided so that either of the two trim controls may be selected.

In the operation of the system, the thermistors T1 and T2 sense any departure of the angle of attack of the jib from the pre-set angle, and this is accompanied by the flashing of $L_1$ or $L_2$ depending on the direction of the angle of attack deviation from the pre-set angle. The helmsman turns selector switch $S_2$ toward trim control $P1_p$ or $P1_s$ to activate the one most convenient to his steering position on that tack. The helmsman would then select the other trim control for the opposite tack. Once the helmsman has trimmed his jib or steered the boat so that the sail is working at its most efficient angle of attack he then turns the trim control that he has selected for use on that tack until neither indicator lamp is flashing. Any change in the angle of attack from the pre-set angle is then indicated by the flashing of the appropriate lamp. On a starboard tack, for example, the flashing of $L_1$ would indicate a condition of low trim (higher angle of attack) or near stall, and a flashing of $L_2$ would indicate a condition of impending luff (lower angle of attack).

Figure 3:
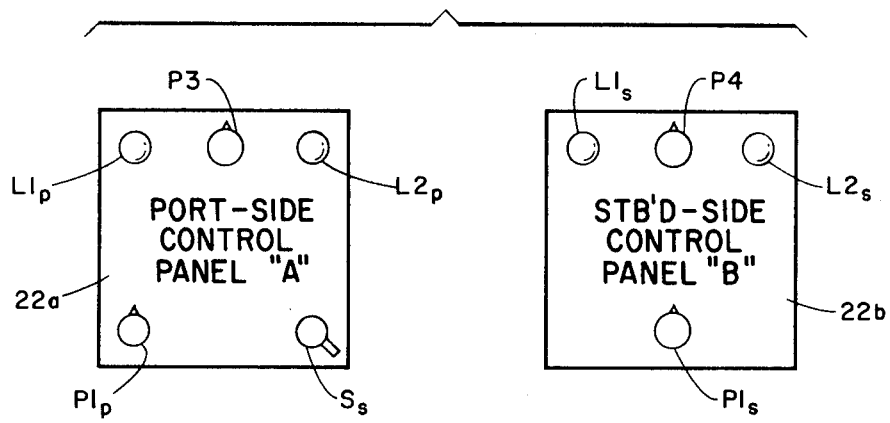
FIG. 3 shows port and starboard control panels which may replace the single panel of FIG. 2.

The control panel 22 in FIG. 2 is intended for use in smaller sailboats, or the like, in which the helmsman has a single compass and can conveniently see and reach the control panel from his normal steering positions. However, the larger sailboats in which the helmsman has two compass positions, two panels 22a and 22b as shown in FIG. 3 may be provided. One of these panels is located, for example, on the port side of the craft, and the other on the starboard side.

The panel 22a, for example, includes the trim control $P1_p$, whereas the panel 22b includes the trim control $P1_s$. The trim control selector switch $S_2$ may be located on the port side control panel 22a. Each panel includes its indicator lights, the lights $L1_p$ and $L2_p$ being located on the panel 22a, and the lights $L1_s$ and $L2_s$ being located on the panel 22b. The dimmer P3 may be used to set the illumination level of the lights on the port control panel 22a, and a further dimmer P4 may be provided for controlling the illumination level of the lights $L1_s$ and $L2_s$ on the starboard control panel 22b.

Figure 4:
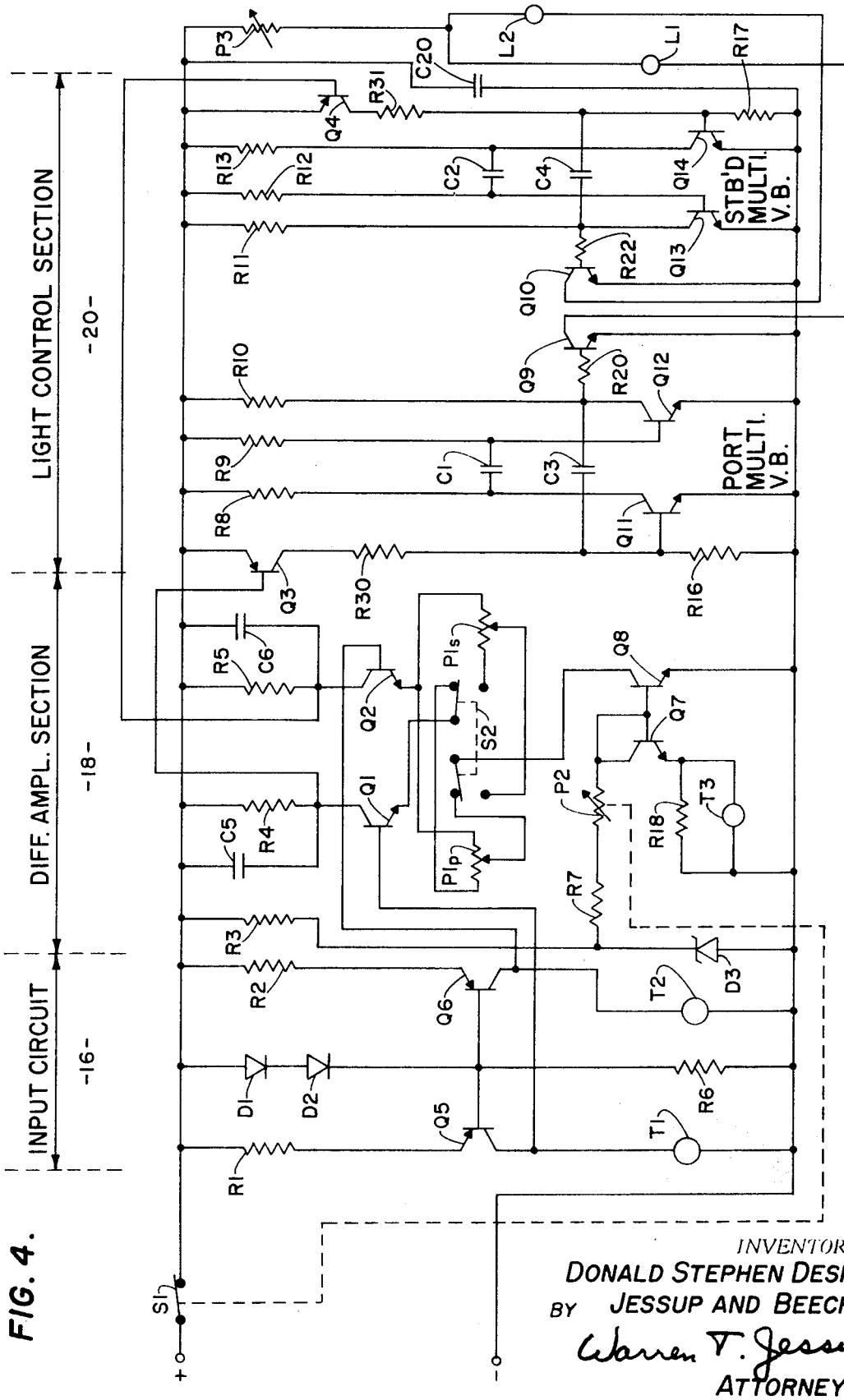
FIG. 4 is a diagram of an appropriate circuit for the system of FIG. 2.

As shown by the circuit diagram of FIG. 4, the thermistors T1 and T2 are included in a bridge circuit with a pair of PNP transistors Q5 and Q6, each of which may be of the type designated 2N3703, the thermistors being included in the respective collector circuits of the transistors. The emitters of the transistors are connected through respective resistors R1 and R2, each having a value, for example, of 42.2 ohms, to the positive terminal of the unidirectional potential source of the system, the negative terminal being connected to the thermistors, as shown.

A pair of diodes D1 and D2 are connected between the positive terminal and the base electrodes of the transistors Q5 and Q6. These diodes may be of the type designated IN4001. The base electrodes are also connected to the negative terminal through a 3.9 kilo-ohm resistor R6. The collectors of the transistors Q5 and Q6 are connected respectively to the base electrodes of a pair of NPN transistors Q1 and Q2. The latter transistors may be of the type designated 2N3711, and are connected as a differential amplifier.

The circuit described above provides a pair of matched current sources 12 and 14 for the thermistors T1 and T2, and it causes current to flow through the thermistors so as to heat the two thermistors to an appreciable temperature level. As described above, the thermistors are mounted on opposite sides of the jib 10. Any change in ambient temperature affects both the transistors to an equal extent, and does not have any effect on the signal level between the collectors of the transistors Q5 and Q6, as applied to the transistors Q1 and Q2. However, any change in the amount of air flow over one of the transistors with respect to the other, provides a change in the signal applied to the transistors Q1 and Q2, the sign and magnitude of which depends upon the sense and magnitude of the change in the air flow. This change in air flow can be related to the sail trim, as described above, As mentioned above, the transistors Q1 and Q2 are connected as a differential amplifier. The collectors of the transistors are connected through respective 6.2 kilo-ohm resistors R4 and R5 to the positive terminal of the unidirectional potential source, these resistors being shunted by respective 2 microfarad capacitors C5 and C6. The emitters of the transistors are connected to the trim control selector switch S , as shown, as are a pair of trim control potentiometers designated P1 and P1 , which are controlled by trim control knobs designated P1 and P1 on the control panel 22. The switch S is a double-pole double-throw switch connected as shown. The potentiometers P1 and P1 may each have a value of 25 kilo-ohms.

A 3.3 kilo-ohm resistor R and Zener diode D3 are connected across the unidirectional potential source, the junction of which is connected to a resistor R7 which may, for example, have a resistance of 39 kilo-ohms. R and D3 provide a stabilized reference voltage for the constant current source formed by R7, P2, R13, T3, Q7 and Q8. The resistor R7 is connected to a 7.5 kilo-ohm potentiometer P2 which, in turn, is connected to the base electrodes of a pair of NPN transistors Q7 and Q8, which may be of the type designated 2N3711. P2 is a sensitivity adjustment to vary the amount of deviation from optimum before the lights flash (dead band). The collector of the transistor Q7 is connected to its base, and the collector of the transistor Q8 is connected to the trim control selector switch S . The emitter of the transistor Q8 is connected to the negative terminal of the unidirectional potential source, and the emitter of the transistor Q7 is connected to that terminal through a 100 ohm resistor R18. The resistor R18 is shunted by a temperature compensating thermistor T3. The potentiometer P2 is mechanically coupled to a switch S1 in the positive lead from the unidirectional potential source, so as to turn the switch S1 off when the potentiometer P2 is turned to its maximum resistance value.

The transistors Q1 and Q2 of the differential amplifier are emitter coupled, the emitter being connected through either the potentiometer P1 or P1 (depending on the setting of the switch S ) to an adjustable current source provided by the circuitry of the transistors Q7 and Q8. This circuit in the common emitter leg of the differential amplifier serves to improve the common mode rejection characteristics of the circuit, and also improves the power supply voltage rejection ratio. Specifically, this circuit (and particularly the elements R18 and T3) serves to render the differential amplifier essentially immune to any effect that changes in ambient temperature might have on the bridge network in the input circuit 16, or from any effect that changes in battery voltage might have on the bridge network.

The collector of the transistor Q1 of the differential amplifier is connected to the base of a PNP transistor Q3, whereas the collector of the transistor Q2 is connected to the base of a PNP transistor Q4. Each of these latter transistors may be of the type designated 2N3703, and they are connected as emitter followers. The collectors of the transistors Q3 and Q4 are connected through respective resistors R16 and R17 to the negative terminal, each of these resistors having a resistance, for example, of 91 kilo-ohms.

The collector of the transistor Q3 is connected through a current limiting resistor R30 to the base of an NPN transistor Q11, whereas the collector of the transistor Q4 is connected through a current limiting resistor R31 to the base of an NPN transistor Q14. The transistor Q11 and an NPN transistor Q12 form a "port" multivibrator; and the transistor Q14 and a further NPN transistor Q13 form a "starboard" multivibrator. The transistors Q11, Q12, Q13, Q14 may each be of the 2N3711 type. The collector of the transistor Q11 is connected to a 1 microfarad coupling capacitor C1 and through an 8.2 kilo-ohm resistor R8 to the positive terminal; and the collector of the transistor Q14 is connected to a like capacitor C2 and to the positive terminal through a like resistor R13.

The capacitor C1 is connected to the base of the NPN transistor Q12 and through a 91 kilo-ohm resistor R9 to the positive terminal. The capacitor C2 is connected to the base of the NPN transistor Q13 and to the positive terminal through a like resistor R12. The collector of the transistor Q12 is coupled back to the base of the transistor Q11 through a trimming capacitor C3 of 10 microfarads, and a similar capacitor C4 is connected to the collector of the transistor Q13 and base of the transistor Q14. The collector of the transistor Q12 is connected to the positive terminal through a 3.9 kilo-ohm resistor R10, and to the resistor R20; whereas the collector of the transistor Q13 is connected to the positive terminal through a 3.9 kilo-ohm resistor R11 and to the resistor R22. A 22 microfarad RF protective capacitor C20 is connected across the source of unidirectional potential. The multivibrators are connected to respective switching transistors Q9 and Q10. Resistors R20 and R22 are included in the base circuits of the latter transistors. The switching transistors Q9 and Q10 may be of the NPN type designated 2N5449.

The circuitry described above of the light control or light driver section 20 serves to buffer the two outputs of the differential amplifier so as to increase the output impedance of the amplifier. In this way a current source is provided for the multivibrators, allowing for use of smaller trimming capacitors C3 and C4.

The potentiometer P2 serves to adjust the current source for the differential amplifier, thereby adjusting the dead band as mentioned above. The potentiometer P2 is such that over a small band centered about the point of perfect sail trim, the output from the differential amplifier is essentially zero. Under these conditions, the voltage output is insufficient to trigger the multivibrators in the light driver section. A small, adjustable dead band is provided, therefore, so that the sail trim can depart to a certain extent on either side of the perfect setting without triggering the light driver circuitry multivibrators.

The two controls represented by the potentiometers P1 and P1 are selectively connected into the circuit by the selector switch S . The purpose of having two controls, rather than one, to pre-select the setting, is so that the setting need not be changed for each change in tack.

The potentiometer P1 sets the output from the differential amplifier to zero for the desired sail trim during, for example, the port tack, and the potentiometer P1 sets the differential amplifier output to zero for the desired sail trim during the starboard tack. The switch S2 permits the helmsman to place, for example, the potentiometer P1 into the circuit during the port tack, and to place, for example, the potentiometer $P1_s$ into the circuit during the starboard tack.

During the port tack, for example, and when the potentiometer $P1_p$ is connected into the circuit by the switch S2, the potentiometer $P1_p$ may be set so that the output from the differential amplifier is insufficient to trigger either multivibrator formed by the transistors Q11/Q12, or Q13/Q14, when the sail is maintained at the optimum attack angle. Each multivibrator then remains in its quiescent state, during which the indicator lamps $L_1$ and $L_2$ are off. It will be noted that each of the multivibrators Q11/Q12 and Q13/Q14 has a relatively fixed light-on period, and an adjustable or variable light-off period.

Now, should the sail depart from its optimum attack angle in one direction, and exceed the normal dead band or range referred to above, a sufficient signal is produced from the differential amplifier to trigger the multivibrator formed by the transistors Q11, Q12 and cause the transistor Q9 to be pulsed, so that the indicator lamp $L_1$ flashes. Since the cross-coupling between the two halves of the multivibrator Q11, Q12, through the respective capacitors C1 and C3 has no DC path, the multivibrator returns to its quiescent original state, to be retriggered again and again so long as the output signal of the differential amplifier is sufficient. It returns to its quiescent state only when an attack angle within the dead band has been reestablished. Should the sail depart from its optimum attack angle in the other direction, the differential amplifier triggers the multivibrator formed by the transistors Q13 and Q14 to cause the lamp $L_2$ to flash. The lamps flash at a rate which increases as the sail departure from the preset angle increases. During the starboard tack, for example, the potentiometer $P1_s$ is connected into the circuit by the selector switch $S_2$, and it is preset to cause the same control to be exerted on the indicator lamps whenever the sail departs from the preset angle for the starboard tack.

Experienced sailors for many years have been using yarn or tape telltales on both sides of their headsail luff to give an indication of sail trim. When sailing in good trim, both telltales stream back parallel to the sail, following the smooth flow of air over both sides of the sail. When the jib is trimmed too tight or one is sailing too low, the leeward telltale flutters indicating that the sail is stalling. Conversely, if one is too high, the weather telltale flutters indicating that the sail is approaching a luff. The system of the invention is designed to display this information about airflow across the sail in a similar manner. The red light $L_1$ represents the telltale on the port side of the sail and the green light $L_2$ the starboard. When the instrument is properly set, the red light will flash under conditions that would cause the port telltale to flutter, and the green light will flash to represent a fluttering of the starboard telltale. When neither light flashes the sail is in trim and the airflow is smooth and efficient.

Figure 5:
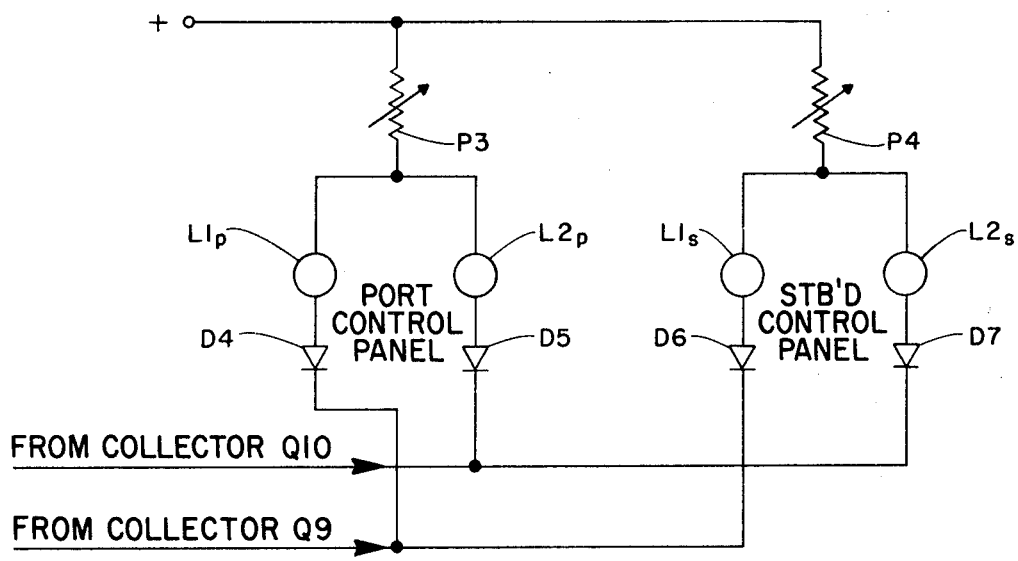
FIG. 5 is an additional circuit diagram showing the manner in which the circuit of FIG. 4 may be adapted for use in conjunction with the control panels of FIG. 3.

For the system of FIG. 3, the same circuit such as shown in FIG. 4 may be used. The only change would be to connect the indicator lights $L1_p$ and $L2_p$ of the port control panel of FIG. 3 into the circuit, as shown in FIG. 5, in place of the indicator lamps $L_1$ and $L_2$, and to provide blocking diodes D4 and D5 which may be of the type designated IN4001. The indicator lights $L1_s$ and $L2_s$ of the starboard control panel are connected in parallel with the original circuit through the starboard dimmer potentiometer P4, as shown in FIG. 5. Two further blocking diodes D6 and D7, which also may be of the type designated IN4001, are included in circuit with the latter control lamps. In the latter circuit, the controls derived from the system energize both the lamps $L1_p$ and $L1_s$, or both the lamps $L2_p$ and $L2_s$ simultaneously, and at illumination levels as established by the respective dimmers P3 and P4.

The system above has been described as being powered by direct current. As will be obvious to those skilled in the art, the system may also be operated as a carrier system, with AC excitation on the bridge, the output being fed to an AC amplifier, synchronous demodulator, and then into the multivibrator.

An improved indicator system is provided, therefore, by which the trim of the sails of a sailboat may be controlled to maintain the optimum attack angle. As mentioned above, the indicator system may also be used in conjunction with the wings of aircraft, or the like, and in any environment in which a predetermined attack angle is to be maintained.

Figure 6:
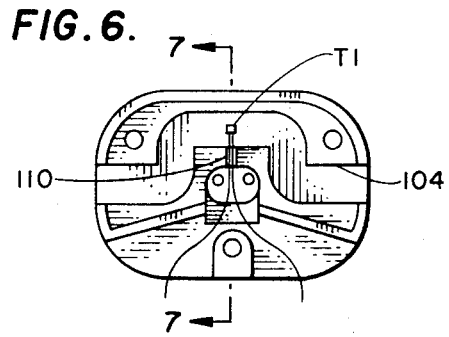
FIG. 6 is a top plan view of an appropriate housing for the sensing elements.
Figure 7:
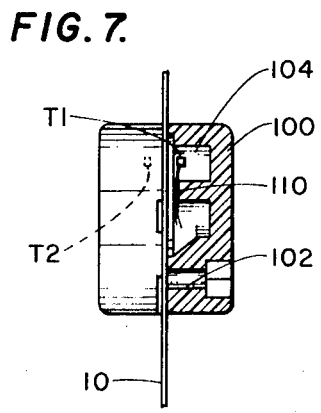
FIG. 7 is a section, taken along the line 7—7 of FIG. 6.

The thermistors $T_1$ and $T_2$ may be mounted in respective housings, such as the housing 100 in FIGS. 6 and 7. The housing 100 is formed, for example, of appropriate plastic material. The housing includes mounting holes 102 which permits it to be mounted on the sail 10 of FIG. 1. The housing defines a passageway 104 which extends from one end of the housing to the other and through which the airstream to be sensed passes. The leads of the thermistor $T_1$ are protected and supported by suitable dielectric encapsulation, and potted into a transverse slot 110. The thermistor $T_1$ itself is thus held in the air stream flowing through the passageway 104.

The housings for the respective thermistors $T_1$ and $T_2$ are mounted back to back with the sail 10 sandwiched between. To protect the thermistors prior to mounting on the sail 10, a thin wall 112 covers the open side of the passageway 104.

The serpentine character of passageway 104 protects the thermistor $T_1$ from damage and from the elements, while still limiting the flow sensing to horizontal air flow contiguous to the sail 10.

While the system has been designed particularly for airfoils and more specifically the sail of a sailing vessel, it will be readily apparent that the structure and concepts here disclosed are also applicable to any fluid foil, be it airfoil or hydrofoil.

What is claimed is:

1. A system for sensing deviations of a fluid foil from a predetermined attack angle with respect to the fluid through which the foil is moving, said system including:
   first and second sensors mounted on the foil on opposite sides thereof and responsive to the fluid stream over the respective surfaces of said foil for providing electrical indications thereof;
   electrical circuit means connected to said sensors for developing electrical output signals whenever the fluid flow differential over the respective surfaces of said foil departs from an optimum range;
   said electrical circuit means including a differential amplifier connected to said sensors for developing electrical output signals having an amplitude related to the differential between the electrical indications provided by said first and second sensors, and multivibrator networks connected to said differential amplifier and responding to the output signals from said differential amplifier to be triggered thereby and indicate the direction and amount of the aforesaid deviations of said foil from said predetermined attack angle; and
   utilization circuitry coupled to said electrical circuit means for developing a predetermined control effect in response to said electrical output from said electrical circuit means.

2. The system defined in claim 1, in which said utilization circuitry includes indicator lamps connected to said multivibrator circuits to be selectively controlled thereby.

3. A system for sensing deviations, from a predetermined attack angle, of the sail of a sailboat which may be sailed on a port or starboard tack, including:
   first and second sensors mounted on the sail on opposite sides thereof and responsive to the air stream over the respective surfaces of said sail for providing electrical indications thereof;
   electrical circuit means connected to said sensors for developing electrical output signals whenever the fluid flow differential over the respective surfaces of said sail departs from an optimum range; and
   utilization circuitry coupled to said electrical circuit means for developing a predetermined control effect in response to said electrical output from said electrical circuit means, said utilization circuitry including a first section for developing said predetermined control effect during said port tack and a second section for developing said predetermined control effect during said starboard tack, and further including selection switching means for conditioning said electrical circuit means and said utilization circuitry selectively for said port tack and said starboard tack.

4. The system defined in claim 3, in which said utilization circuitry includes a pair of indicator lights connected to be selectively energized during the port tack in accordance with a first parameter, and to be selectively energized during the starboard tack in accordance with a second parameter.

5. The system defined in claim 4, in which said indicator lights are located on a single control panel.

6. The system defined in claim 4, in which said utilization circuitry includes a further pair of indicator lights respectively connected in shunt with said first-mentioned pair and located on a second panel.

* * * * *